(12) United States Patent
Baron

(10) Patent No.: US 11,049,080 B2
(45) Date of Patent: Jun. 29, 2021

(54) FILE VAULT AND CLOUD BASED DOCUMENT NOTARY SERVICE

(71) Applicant: INTEL CORPORATION, Santa Clara, CA (US)

(72) Inventor: Casey L. Baron, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/889,049

(22) Filed: Feb. 5, 2018

(65) Prior Publication Data

US 2019/0026709 A1 Jan. 24, 2019
US 2019/0197502 A9 Jun. 27, 2019

Related U.S. Application Data

(63) Continuation of application No. 15/138,372, filed on Apr. 26, 2016, now Pat. No. 9,886,684, which is a
(Continued)

(51) Int. Cl.
*H04L 29/06* (2006.01)
*G06Q 20/10* (2012.01)
(Continued)

(52) U.S. Cl.
CPC .......... *G06Q 20/102* (2013.01); *G06F 21/16* (2013.01); *G06F 21/602* (2013.01);
(Continued)

(58) Field of Classification Search
CPC combination set(s) only.
See application file for complete search history.

(56) References Cited

U.S. PATENT DOCUMENTS 5,127,249 A 7/1992 Peyron et al.
5,727,249 A 3/1998 Pollin
(Continued)

FOREIGN PATENT DOCUMENTS

CN 1811810 8/2006
CN 104040543 A 9/2014
(Continued)

OTHER PUBLICATIONS

International Searching Authority, "Notification of Transmittal of the International Search Report and the Written Opinion of the International Searching Authority," dated Sep. 26, 2012, in International application No. PCT/US2012/020859, 10 pages.
(Continued)

*Primary Examiner* — Shin-Hon (Eric) Chen
(74) *Attorney, Agent, or Firm* — Hanley, Flight & Zimmerman, LLC

(57) ABSTRACT

In one embodiment, a trusted cloud service such as an "electronic vault" may store records of a consumer's electronic data file history. These documents may come from disparate providers and include financial statements and the like. The trusted vault cloud may act as an online notary to certify documents are legitimate and may be trusted. For example, a retailer may dispute whether the consumer paid a debt. To resolve the issue the retailer may access the cloud vault to retrieve a bank statement for the consumer, whereby the bank statement is electronically notarized by the vault cloud and is thus credible to the retailer. The retailer may then see proof the consumer had indeed paid a past debt to the retailer. Other embodiments are described herein.

24 Claims, 5 Drawing Sheets

Related U.S. Application Data continuation of application No. 13/993,341, filed as application No. PCT/US2012/020859 on Jan. 11, 2012, now Pat. No. 9,344,416.

(51) Int. Cl.

| | |
|---|---|
| G06Q 50/18 | (2012.01) |
| G06F 21/16 | (2013.01) |
| G06F 21/64 | (2013.01) |
| G06Q 40/02 | (2012.01) |
| G06F 21/60 | (2013.01) |
| G06Q 10/10 | (2012.01) |
| H04L 9/08 | (2006.01) |
| H04L 9/32 | (2006.01) |
| H04L 29/08 | (2006.01) |

(52) U.S. Cl.
CPC ........... *G06F 21/645* (2013.01); *G06Q 10/10* (2013.01); *G06Q 40/02* (2013.01); *G06Q 50/18* (2013.01); *H04L 63/0428* (2013.01); *H04L 63/08* (2013.01); *H04L 63/12* (2013.01); *H04L 63/123* (2013.01); *H04L 63/126* (2013.01); *G06F 2221/2151* (2013.01); *H04L 9/0894* (2013.01); *H04L 9/3247* (2013.01); *H04L 63/0442* (2013.01); *H04L 67/10* (2013.01)

(56) References Cited

U.S. PATENT DOCUMENTS

| | | | | |
|---|---|---|---|---|
| 6,836,765 | B1 | 12/2004 | Sussman | |
| 6,856,974 | B1* | 2/2005 | Ganesan | G06Q 20/02 705/35 |
| 6,936,765 | B2 | 8/2005 | Horner | |
| 7,392,223 | B1* | 6/2008 | Ganesan | G06Q 20/10 705/34 |
| 7,577,689 | B1 | 8/2009 | Masinter et al. | |
| 9,344,416 | B2 | 5/2016 | Baron | |
| 9,886,684 | B2 | 2/2018 | Baron | |
| 2002/0002536 | A1* | 1/2002 | Braco | G06Q 20/04 705/40 |
| 2002/0049671 | A1* | 4/2002 | Trende | G06Q 20/102 705/40 |
| 2002/0073202 | A1 | 6/2002 | Wang et al. | |
| 2002/0143704 | A1 | 10/2002 | Nassiri | |
| 2002/0143711 | A1 | 10/2002 | Nassiri | |
| 2002/0178122 | A1 | 11/2002 | Maes | |
| 2004/0143546 | A1* | 7/2004 | Wood | G06Q 20/102 705/40 |
| 2004/0210520 | A1* | 10/2004 | Fitzgerald | G06Q 20/04 705/40 |
| 2006/0116949 | A1* | 6/2006 | Wehunt | G06Q 10/00 705/35 |
| 2007/0022017 | A1 | 1/2007 | Bhambri et al. | |
| 2007/0067239 | A1* | 3/2007 | Dheer | G06Q 20/102 705/40 |
| 2007/0220614 | A1 | 9/2007 | Ellis et al. | |
| 2008/0148396 | A1 | 6/2008 | Jung et al. | |
| 2010/0161993 | A1 | 6/2010 | Mayer | |
| 2010/0185473 | A1* | 7/2010 | Malkareddy | G06Q 30/0241 705/30 |
| 2011/0251952 | A1* | 10/2011 | Kelly | G06Q 20/14 705/40 |
| 2011/0307275 | A1 | 12/2011 | Subin et al. | |
| 2013/0007845 | A1 | 1/2013 | Chang et al. | |
| 2013/0269006 | A1 | 10/2013 | Baron | |
| 2014/0013110 | A1 | 1/2014 | Thoniel et al. | |
| 2014/0095389 | A1* | 4/2014 | Caldwell | G06Q 20/10 705/44 |
| 2017/0024711 | A1 | 1/2017 | Baron | |
| 2018/0232711 | A1 | 8/2018 | Baron | |

FOREIGN PATENT DOCUMENTS

| | | |
|---|---|---|
| CN | 104040543 B | 1/2018 |
| DE | 102005033195 | 1/2007 |
| EP | 2803010 | 11/2014 |
| JP | 22002279176 | 9/2002 |
| JP | 3918087 | 5/2007 |
| KR | 1020110070613 | 6/2011 |
| WO | 2007023032 | 3/2007 |
| WO | 2008132248 | 11/2008 |
| WO | 2011021168 | 2/2011 |
| WO | 2013105941 | 7/2013 |

OTHER PUBLICATIONS

European Patent Office, Supplemental European Search Report dated Aug. 25, 2015, in European Patent Application No. 12864913. 4, 5 pages.

Office of the Registrar, "Delivery Methods for Transcripts," Penn State Office of the Registrar, 2005, 2 pages.

State Intellectual Property of the People's Republic of China, First Office Action dated Aug. 3, 2016, Chinese Patent Application No. 201280066657.7, 18 pages.

State Intellectual Property Office of the People's Republic of China, Second Office Action dated Mar. 8, 2017 in Chinese Patent Application No. 201280066657.7, 10 pages.

European Patent Office, Communication pursuant to Article 94(3) EPC dated Aug. 17, 2016 in European Patent Application No. 12864913.4, 5 pages.

European Examination Report received in European Patent Application No. 12864913, dated Nov. 30, 2018, 6 pages.

State Intellectual Property Office of the People's Republic of China, Notice of Allowance dated Sep. 30, 2017 in Chinese Patent Application No. 201280066657.7, 8 pages.

International Searching Authority, "Notification Concerning Transmittal of Copy of International Preliminary Report on Patentability," dated Jul. 24, 2014, in International application No. PCT/US2012/020859, 7 pages.

"European Application Serial No. 12864913.4, Response filed Mar. 21, 2016 to Extended European Search Report dated Aug. 25, 2015", 10 pgs.

"European Application Serial No. 12864913.4, Response filed Feb. 27, 2017 to Communication Pursuant to Article 94(3) EPC dated Aug. 17, 2016", 9 pgs.

"European Application Serial No. 12864913.4, Response filed Apr. 10, 2019 to Communication Pursuant to Article 94(3) EPC dated Nov. 30, 2018", 9 pgs.

"European Application Serial No. 12864913.4, Summons to Attend Oral Proceedings dated May 6, 2020", 7 pgs.

"U.S. Appl. No. 13/993,341, Preliminary Amendment filed Jun. 12, 2013", 8 pgs.

"U.S. Appl. No. 13/993,341, Non Final Office Action dated Feb. 20, 2015", 12 pgs.

"U.S. Appl. No. 13/993,341, Response filed May 8, 2015 to Non Final Office Action dated Feb. 20, 2015", 9 pgs.

"U.S. Appl. No. 13/993,341, Final Office Action dated May 28, 2015", 11 pgs.

"U.S. Appl. No. 13/993,341, Response filed Aug. 28, 2015 to Final Office Action dated May 28, 2015", 8 pgs.

"U.S. Appl. No. 13/993,341, Notice of Allowance dated Sep. 15, 2015", 7 pgs.

"U.S. Appl. No. 13/993,341, 312 Amendment filed Dec. 15, 2015", 7 pgs.

"U.S. Appl. No. 13/993,341, Notice of Allowance dated Jan. 13, 2016", 8 pgs.

"U.S. Appl. No. 13/993,341, 312 Amendment filed Apr. 12, 2016", 7 pgs.

"U.S. Appl. No. 13/993,341, PTO Response to Rule 312 Communication dated Apr. 19, 2016", 2 pgs.

"U.S. Appl. No. 15/138,372, Non Final Office Action dated Jan. 18, 2017", 9 pgs.

"U.S. Appl. No. 15/138,372, Response filed Apr. 18, 2017 to Non Final Office Action dated Jan. 18, 2017", 6 pgs.

(56) References Cited

OTHER PUBLICATIONS

"U.S. Appl. No. 15/138,372, Final Office Action dated May 24, 2017", 7 pgs.
"U.S. Appl. No. 15/138,372, Response filed Aug. 24, 2017 to Final Office Action dated May 24, 2017", 7 pgs.
"U.S. Appl. No. 15/138,372, Notice of Allowance dated Sep. 27, 2017", 7 pgs.
"U.S. Appl. No. 15/138,372, 312 Amendment filed Dec. 18, 2017", 7 pgs.
"U.S. Appl. No. 15/138,372, PTO Response to Rule 312 Communication dated Dec. 26, 2017", 2 pgs.
"U.S. Appl. No. 15/888,309, Preliminary Amendment filed May 4, 2018", 6 pgs.
"U.S. Appl. No. 15/888,309, Non Final Office Action dated Jun. 19, 2018", 7 pgs.
"Chinese Application Serial No. 201280066657.7, Response filed May 23, 2017 to Office Action dated Mar. 8, 2017", w/ Concise Statement of Relevance, 10 pgs.
"Chinese Application Serial No. 201280066657.7, Response filed Dec. 19, 2016 to Office Action dated Aug. 3, 2016", w/ Concise Statement of Relevance, 9 pgs.
"European Application Serial No. 12864913.4, Written Submissions filed Oct. 5, 2020 to Summons to Attend Oral Proceedings dated May 6, 2020", 10 pgs.

\* cited by examiner

FILE VAULT AND CLOUD BASED DOCUMENT NOTARY SERVICE

CROSS-REFERENCE TO RELATED APPLICATION

This present application is a continuation of and claims priority from U.S. application Ser. No. 15/138,372 filed Apr. 26, 2016, now U.S. Pat. No. 9,886,684, which is a continuation of U.S. application Ser. No. 13/993,341 filed on Jun. 12, 2013, now U.S. Pat. No. 9,344,416, which is a National Stage Entry of PCT/US2012/020859 filed Jan. 11, 2012, the entire disclosures of which are incorporated herein by reference.

BACKGROUND

Business organizations often store electronic documents for their customers. For example, a bank may store Portable Document Format (PDF) copies of a customer's account statements. The customer can then log onto the bank's website and view present and past statements. While this offers certain conveniences, this system also creates numerous issues for the customer. Some of these are issues are described below in the context of a bank customer trying to access his or her past bank account statements. This banking scenario is used to for ease of description, but the issues are not limited to the financial sector.

First, a customer may be required to manually log onto the bank's website and individually download statements if he or she wants to keep his or her own copy of the statement. The steps required to do so vary from entity to entity, which can be frustrating for a consumer trying to manage statements from different banks, brokerages, insurance providers, and the like. Second, a consumer must secure and backup any of the electronic files he or she wishes to archive for any length of time. After all, the bank controls how long old statements may be accessible online. Consequently, a consumer storing old statements on a hard drive may lose those statements if the hard drive fails. Then the customer has lost his or her archived statements. Third, there is no element of authenticity for a customer's downloaded copy. For example, an original paper statement from a bank may have some level of authenticity to a third party due to, for example, the ink and logos used on the statement. However, the equivalent document downloaded by a consumer may lack the same level of authenticity because, for example, the third party may fear electronic copies of the record are susceptible to tampering. More specifically, there is no independent party to attest to the legitimacy of the downloaded document and attempt to establish that the document was authenticate when it was delivered from the bank to the customer. Thus, there is no electronic "notarization" of the document the consumer downloads. Fourth, the business determines the security mechanisms used to ensure the documents are securely stored. These mechanisms vary greatly from company to company and may not rise to the level desired by the consumer. Fifth, consumers lack a single location to automatically store records from disparate entities. Sixth, when consumers close accounts the statements related to those accounts may no longer be available online to the consumer.

The issues listed above may have very real consequences. For example, properly archived authenticated records may help resolve legal disputes. A customer may purchase a television from a department store. The customer may pay for the television with a check that eventually clears, as evidenced by a bank statement. However, the customer may eventually close the account. As time goes by, the department store may assert the consumer never paid for the television. The payment dispute could be resolved if the consumer had access to the statement from the bank. Unfortunately, as indicated above, this statement may no longer be readily available online to the user because he or she closed the account or the statement is simply so old the bank no longer offers access to it online.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
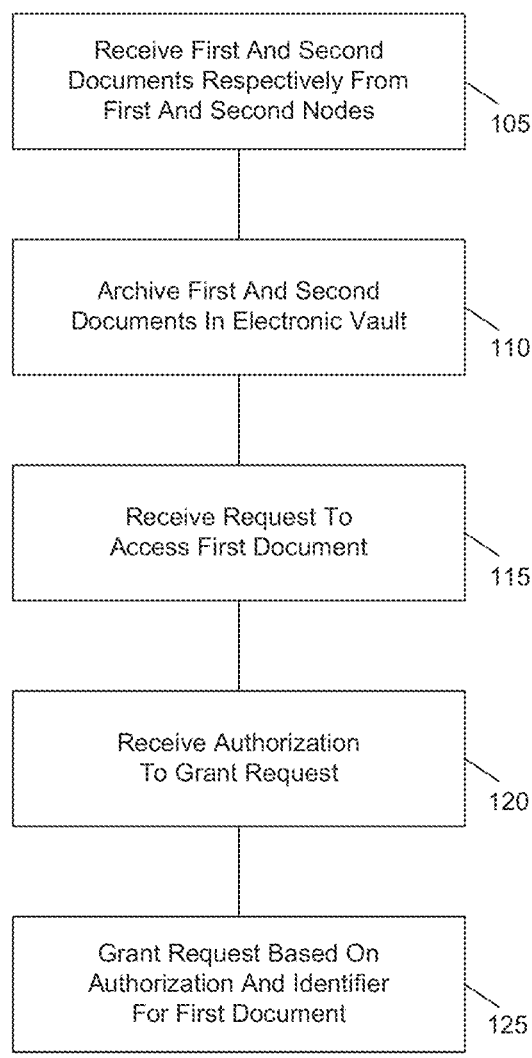
FIG. 1 includes a flow chart for a process in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

In one embodiment, a trusted cloud service such as an "electronic vault" may store records of an individual's electronic data file history. These documents may come from disparate providers and include, without limitation, financial statements, utility bills, credit card statements, credit reports, medical records (e.g., immunization records, prescriptions), contracts (e.g., waivers for a child to participate in an event), reward programs for airline miles, tax forms, e-mail, short message service (SMS) texts, voice mail, and the like. The vault could maintain a master record for each consumer to help consumers have a one stop reference for all their business relationships. For example, the consumer may see a list of all of his or her point loyalty programs and balances, with the ability to delve deeper into each one for monthly statements and to obtain data to contact the businesses.

In an embodiment, once enrolled to the vault a user will receive an electronic address. A document provider, such as a bank, may be granted permission from the user to place data in the user's personal account in the vault. The identity of the document provider may be verified by signing the documents with a trusted certificate that can be verified by a certificate authority.

In an embodiment a trusted cloud service may establish relationships with document providers (e.g., banks) to facilitate the automatic retrieval and storage of electronic documents on behalf of subscribed consumers. For example, consumers could create a secure vault account. The consumer would then be able to subscribe for electronic statements from disparate businesses that are listed as providers that cooperate with the vault service. If a business is not listed, consumer could request that the business be added for subscriptions and/or the consumer could manually upload documents obtained from a business.

The trusted cloud service may act as an online notary to certify documents are legitimate and may be trusted. Errors and discrepancies between a consumer and a business could be resolved by referring back to the vault for a snapshot of what a statement in question looked like at the time the statement was archived.

Thus, as noted above, embodiments may provide a consumer controlled service to automate the downloading, organization, retention, validation, and purging of personal electronic records in the cloud. Embodiments may combine document management tools with electronic document notarization. A more detailed discussion of embodiments is set out below.

Figure 4:
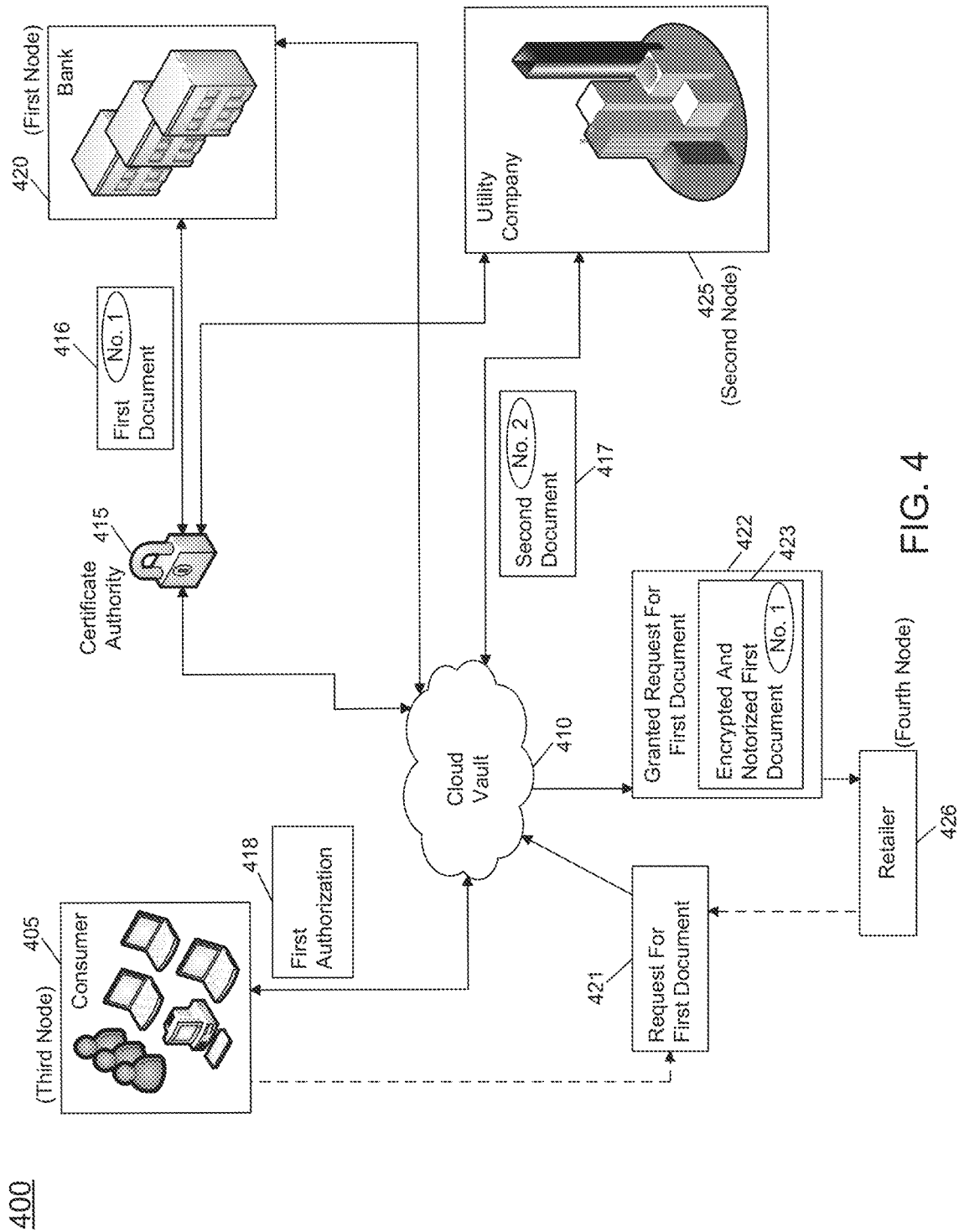
FIG. 4 includes a network environment in an embodiment of the invention.

FIG. 4 includes a network environment in an embodiment of the invention. Environment 400 includes node 405 for a consumer, which is coupled (via cloud 410) to document providers at nodes 420, 425. As explained further below, provider 420 may include banks, credit card companies, brokerages, and the like. Provider 425 may include utility companies, point reward programs, and the like. Block 415 represents a certificate authority, with concerns encryption described more fully in regards to FIG. 2.

FIG. 1 includes a flow chart for an embodiment of the invention. In block 105 of process 100, a system (e.g., vault system) receives a first document from a first node and a second document from a second node. The system may include at least one processor coupled to at least one non-volatile machine accessible medium (e.g., included as a single processor coupled to single memory included in one chassis, distributed across several processor cores and several memories in a distributed computing system, and the like). For example, the system may be implemented (without limitation) using the system of FIG. 5. The first document may include a bank statement from the first node, which is a server managed by the bank. The second document may include a brokerage statement from a second node, which is a server managed by a brokerage unaffiliated with the bank. The first and second nodes may remotely couple to the system via a wired or wireless network, such the internet, local area network (LAN), wide area network (WAN), and the like.

In block 110 the vault system may store the first and second documents in the system. As stated above, the system may include at least one non-volatile machine accessible medium, which may be used to store the documents. This storing may include archiving the first and second documents in a non-volatile memory so that, after a period of time passes (e.g., ten years), the documents may still be retrieved. Such documents may be useful for, as an example, social security numbers or title documents.

The first and second documents may be respectively assigned to first and second document identifiers. For example, globally unique identifiers (GUID) may be used to identify the first and second documents. A GUID may include a unique reference number used as an identifier in computer software. The GUID may be based on various standards (e.g., universally unique identifier (UUID) standard). In one embodiment each identifier is represented as a 32-character hexadecimal string and stored as a 128-bit integer. The probability of the same identifier being generated randomly twice is negligible.

In block 115 the system receives a first request to access the first document, the first request corresponding to the first document identifier. In an embodiment a first party, such as the aforementioned bank, is associated with the first node. The third node may be associated with, for example, the bank customer. In that case the third node may be the customer's home computer, personal digital assistant, smart phone, and the like. Regardless, the first request may come from the first node, the third node, or some other node altogether. Thus, the first request may correspond to the first node (e.g., bank), third node (e.g., bank customer), or somewhere else like a fourth node (e.g., department store that asserts a bank customer did not pay his or her bill). In other words, many different parties (and many different nodes that correspond to the parties) may correspond to the first request.

In block 120 the system may receive a first authorization from the third node. For example, a bank customer at the third node may provide a security credential (e.g., password) to allow access to a document. However, the bank customer may provide the security credential (e.g., a one time password) to a department store and the department store may supply the credential to the vault. Either scenario amounts to the system receiving (directly or indirectly) a first authorization from the third node. Further still, the authorization may include the third node supplying the email address of a party that desires to access the document. The provision of the email constitutes authorization.

In block 125 the system may grant the first request based on the first authorization and the first document identifier. For example, if a party supplies a pass code and a GUID for the statement in question, the system may grant access to the document. The requesting party may "get access" in several ways. For example, the requested document may be pushed (e.g., sent) from the vault system to the requester using, for example, the user's email address. However, a party may "get access" by instead having the vault system allow the user to access the vault system and pull (e.g., download) the document from the system.

In the above scenario, the third party bank customer may have an active account with the first party bank when the first document is received from the first node (bank). However, the third party customer may have closed the account with the first party bank after the first document is received by the vault system but before the first request document is received from the vault system. Further, the third party customer may have no additional account open with the first party when the first request document is received.

Figure 2:
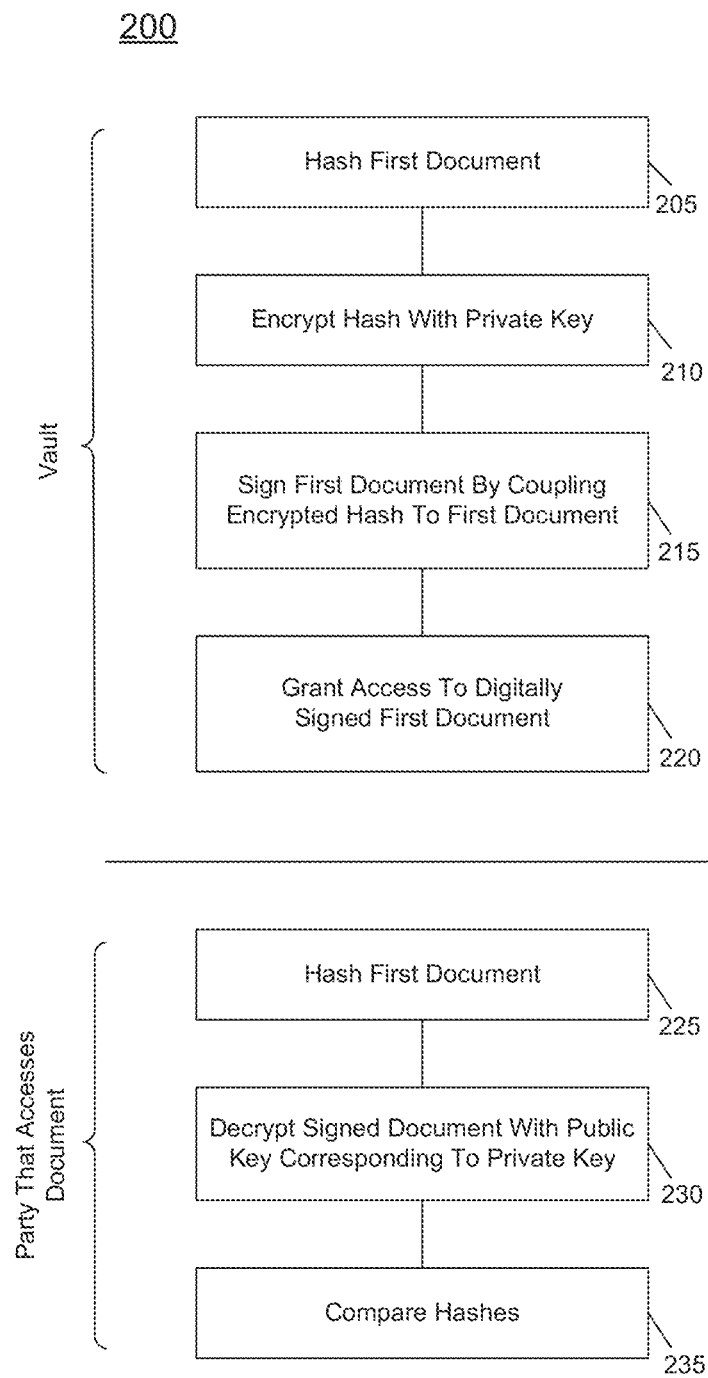
FIG. 2 includes a flow chart for a process in an embodiment of the invention.

FIG. 2 includes a schematic flow chart for an embodiment of the invention. In block 205 of process 200 a system may hash the first document that was the subject of FIG. 1. Thus, the vault system may hash the archived bank statement.

In block 210 the system may encrypt the hash with the system's private key. For example, the electronic vault may implement an asymmetric key protocol with a private key and a corresponding public key.

In block 215 the system may digitally sign the first document by coupling the encrypted hash to the first document. In block 220 a party may be granted access to the signed document.

In block 225 an interested party that receives access to the first document may hash the document. In block 230 the party may decrypt the encrypted hash. The party may use the public key corresponding to the private key used by the electronic vault system in step 210. The party may receive the public key from a certificate authority. In an embodiment, the certificate including the public key may be coupled to the first document.

In block 235 the party may compare hashes of blocks 205, 225 to see if the document is authenticate as stored with the electronic vault.

Thus, before granting the request of FIG. 1 the system may encrypt the first document with a private key that corresponds with a publically available public key. Further, the system may digitally sign the first document before granting the request to access the document.

In an embodiment the signed document that is accessed may provide date information (e.g., timestamp included in a watermark or another document coupled to the bank statement). The date information may be derived from metadata originally coupled to the bank statement when that statement was first received by the archive. Metadata may also include information such as, for example, the IP address for the document provider (e.g., bank), customer's account number at the document provider, and the like.

The document accessed may be restricted. For example, a timestamp (e.g., regarding when the document was first transferred from the bank to the vault) may be included in a watermark attached to a PDF of the first document. The watermark may include other data, such as metadata from when the document was originally received by the vault (e.g., metadata may include the identity of the node from which the document was received).

Based on a digital certificate (from the bank) the vault may understand the first document was authentically received from a bank in an unaltered condition. This authenticity, when coupled to the authenticity provided in FIG. 2 (i.e., authenticity provided by the vault), may provide a chain of custody that is based on authenticity from the bank to the vault and from the vault to the next document recipient. This chain may be graphically displayed as shown in, for example, FIG. 3.

Figure 3:
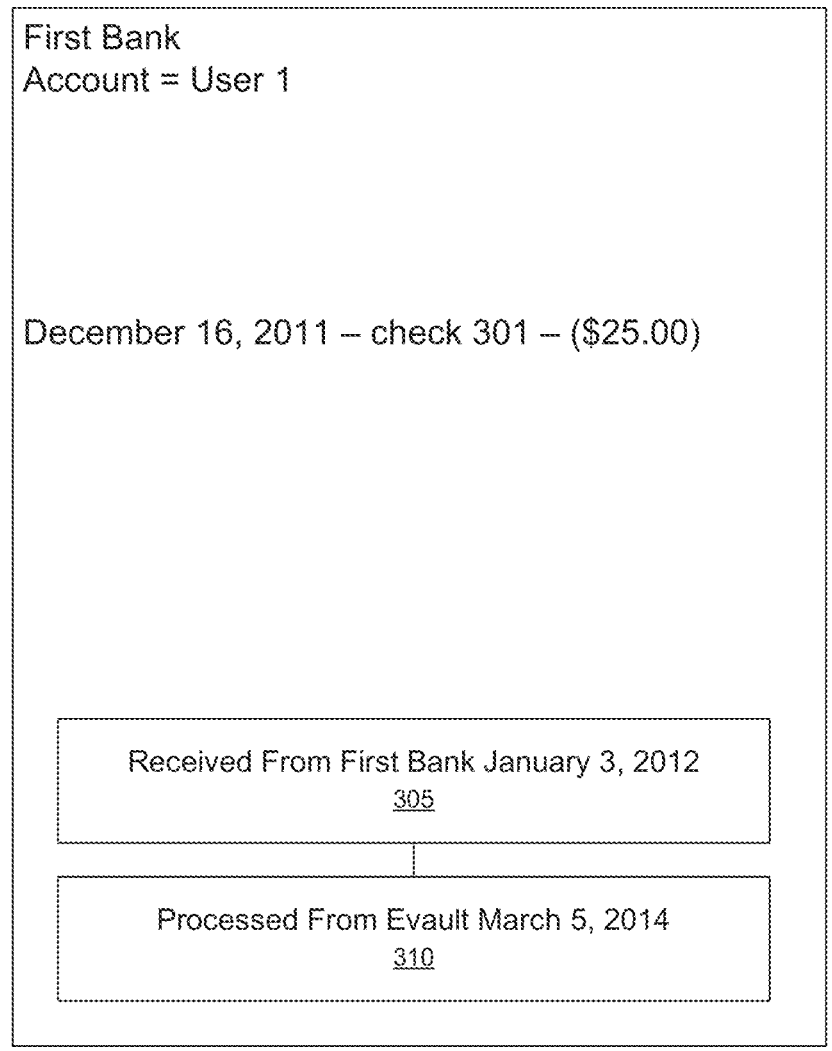
FIG. 3 includes a representation of a document in an embodiment of the invention.

FIG. 3 includes document 300, which provides a bank statement having a visible chain of custody including link 305 (indicating when the statement was received from the bank) and link 310 (indicating when the statement was accessed on the electronic vault). Links 305, 310 are just examples of content and may any of varied content (e.g., the party that accessed the document, how the document was accessed (downloaded by a smartphone at time X), and the like).

Thus, in one embodiment the system receives a document from the bank and that document has been digitally signed by the bank. The system then digitally signs the first document with a second digital signature before granting the access request. The second digital signature is from the electronic vault. The system then couples the bank statement to a watermark that is based on both of the first and second digital signatures. The watermark could include elements such as blocks 305, 310 from FIG. 3. The watermark, based on the chain of electronic signatures, quickly shows a viewer a chain of custody and authenticity.

Returning to FIG. 1, block 105 may be implemented in several different ways. For example, the vault system may periodically receive additional documents. The vault system may obtain monthly statements. Those documents may be uploaded by the vault system (e.g., pulled from the bank web site to the vault system) once the user provides the vault system with security credentials such as his or her bank account number and password for accessing the bank website. However, the vault system may instead receive documents pushed from the bank website to the vault system. For example, the user may direct the bank to email PDF statements to his or her account with the vault system. To facilitate this the customer may provide his vault account and password to the bank.

Regarding block 120 of FIG. 1, in one embodiment a user may establish a guest account (for another party) on the vault system. Thus, when the interested party provides the vault system with a security credential associated with the guest account, such as a pass code and document identifier, the vault system may grant a request to access the bank statement based on the guest account and the at least one security credential.

A guest account may include an account whereby a visitor can gain access to another user's account with the permission of that user. Thus, a bank customer may create a guest account for a department store. The guest account allows the store to access the bank customer's account with the electronic vault. The access may be limited. For example, the user may be allowed only access to the document for which the user provides the requisite document identifier. In another embodiment, the pass code supplied to the interested party may be linked to only a single document. Thus, when the department store enters the pass code the desired bank statement is automatically accessed. Guess accounts such as, for example, the guest account utility in Microsoft Windows XP® may be used.

Where an established business relationship interface does not yet exist between the vault and a document provider such as the bank, the vault can have a customer register his or her bank website login information (e.g., account number and pass code) and the vault system will use that information to periodically pull the data directly from the document provider.

However, in an embodiment the electronic vault may establish a subscription service with a document provider for documents (e.g., bank producing account statements) on a much larger scale. The subscription service may be implemented in various ways including providing an interface at the vault for the bank to upload statements, providing an interface at the bank for the vault to pull documents from the bank site, or a combination of both. Thus, the vault, which may have thousands of consumer subscribers, may access the bank website for each of its many subscribers, log in to the website, and pull the individual's bank statement. However, the system may instead receive thousands of statements from the bank using a secure bulk transfer or transfers of numerous documents per transfer. Thus, in one embodiment the vault receives, for example, a first bank statement from a bank during a first transfer transaction and another bank statement from the bank during the same first transfer transaction. The bank statements may be for different customers. This allows the vault to scale up and avoid overly burdening the vault and/or the bank with individual accesses for individual accounts. The bank and/or vault may charge customers a service charge to compensate for the efforts of the bank and/or vault to gather the statements. The vault may market its services to providers, who may then market their compatibility with the vault.

One scenario for using embodiments is a follows. User1 maintains a subscription to the vault service to store his Bank1 statements. Thus, Bank1 statements are periodically stored/archived in the vault. During the process of moving, User1 pays off his Store1 credit card from his Bank1 checking account. User1 remembers that he requested Store1 to close his account so he does not provide a forwarding address to Store1 and never receives a closing statement from Store1. After moving User1 switches banks from Bank1 to Bank2. His Bank1 checking account is now closed. The following year, User1 applies for a new Bank2 credit card and is rejected due to a delinquent Store1 account on his credit report. User1 contacts Store1, who denies ever receiving payment. User1 can no longer obtain online statements from the Bank1 account since it is closed. He cannot find any of his old Store1 statements.

In an embodiment, User1 logs into the vault system and finds the archived Bank1 statement that proves he paid the Store1 bill. User1 downloads a certified copy of this statement (e.g., the original PDF is coupled to a vault cover page with instructions, GUID, and metadata including timestamps for when the document was originally received from Bank1). User1 emails this statement to Store1. Store1 goes to the vault and follows the cover page instructions to upload the certified copy using the vault verification tool. The vault uses the GUID to match that uploaded document to the archived certified copy and perform comparison verification to confirm the files match. The vault informs Store1 the document provided from User1 is authentic.

Another scenario is as follows. User1 is in a dispute with her public school district over her son's Individualized Education Program (IEP). User1 provides guest account access to a subset of documents stored on the vault. User1 manually uploads all IEP documents, school letters, voicemails, and audio recordings of IEP team meetings to her vault account. The IEP team places User1's son in an expensive out-of-district private school placement. The public school district pays tuition and mileage reimbursement to User1. The public school district has high staff turnover and records are incomplete and/or lost. Budget cuts put pressure on staff to reduce expensive educational placements. The new special education department staff makes unilateral budget-related changes to the IEP based on an incomplete version of the facts and differing interpretation of the IEP document. User1 argues with the school district about the unilateral change. User1 logs into his vault account and creates a guest account for the school district personnel to be able to retrieve his copies of the documents and meeting audio related to the dispute. District employees log in to the guest account to listen to the meeting recording and review John's version of the IEP documents. The school district downloads these records to update their own files. The school district then decides to maintain the prior placement for User1's son.

In an embodiment, a user may be able to redact portions of an archived document before sharing the document. For example, a user might redact his social security information using online vault tools. While the vault validates the authenticity of the un-redacted portions and metadata, it clearly highlights the redacted portions protecting the consumer from potential identity theft.

Thus, various embodiments provide more than just information from a provider (e.g., a bank), but instead provide actual documents (such as PDFs of bank statements) as they were received from the original provider, archived at the vault, and then accessed (possibly with watermarks coupled to the document) by an interested party.

One embodiment includes a method executed by at least one processor. Referring to FIG. 4, cloud vault 410 may receive first document 416 from first node 420 associated with a first party (e.g., bank) and second document 417 from second node 425 associated with a second party (e.g., utility company), the first and second nodes 420,425 remotely coupled to the at least one processor of cloud vault 410 via a network (e.g., internet). Cloud vault 410 may store first and second documents 416, 417 in at least one non-volatile machine accessible medium (e.g., memory) coupled to the at least one processor of cloud vault 410, the first and second documents 416, 417 respectively assigned to first and second document identifiers (e.g., identifiers "No. 1" and "No. 2"). Cloud vault 410 may receive first request 421 to access first document 416, the first request corresponding to the first document identifier "No. 1". Cloud vault 410 may receive first authorization 418 from third node 405, associated with third party (e.g., consumer), that is remotely coupled to the at least one processor of cloud vault 410 via the network. Could vault 410 may grant the first request 421 based on the first authorization 418 and the first document identifier "No. 1". First document 416 may corresponds to a first account statement, such as a bank statement, between the first (bank) and third (consumer) parties.

The third party consumer may have an active account (bank account) with the first party bank when the first document (bank statement) is received from the first node. However, the third party consumer may have closed the account with the first party bank after the first document is received but before the first request to access the first document 421 is received, and the third party consumer may have no additional account open with the first party bank when the first request to access the first document 421 is received.

The method may include, before granting first request 421, encrypting the first document with a private key that corresponds with a publically available public key (see block 422 and encrypted document 423).

The method may include receiving first request to access the first document 421 from a fourth node 426 associated with a fourth party (retailer that has a dispute with the consumer of node 405).

Examples used herein have often dealt with banks and bank statements but embodiments are not limited to banks or bank statements. The uses for embodiments are varied and include, without limitation, financial statements, utility bills, credit card statements, credit reports, medical records (e.g., immunizations), contracts (e.g., waivers for a child to participate in an event), reward programs for airline miles, tax forms, e-mail, short message service (SMS) texts, voice mail, and the like.

Also, as used herein a document is periodically said to be sent from place to place (e.g., a bank to the vault) and then possibly accessed at a later time. Notably, "the document" may be embodied in various instances of the document. For example, when the vault transfers "the document" to a user, doing so does not necessarily mean the vault no longer retains an instance of the document or that the document was not indeed transferred to the user. Further, transferring the document to a user may entail transferring a multipage PDF document to the user. The multipage document may include the original bank statement along with additional PDF pages that include information such as timestamps, and the like.

Those timestamps may instead be included in a watermark coupled to the document. Also, PDF forms have been referred to herein but documents are not limited to PDF forms and may take other formats that still provide authenticity.

Figure 5:
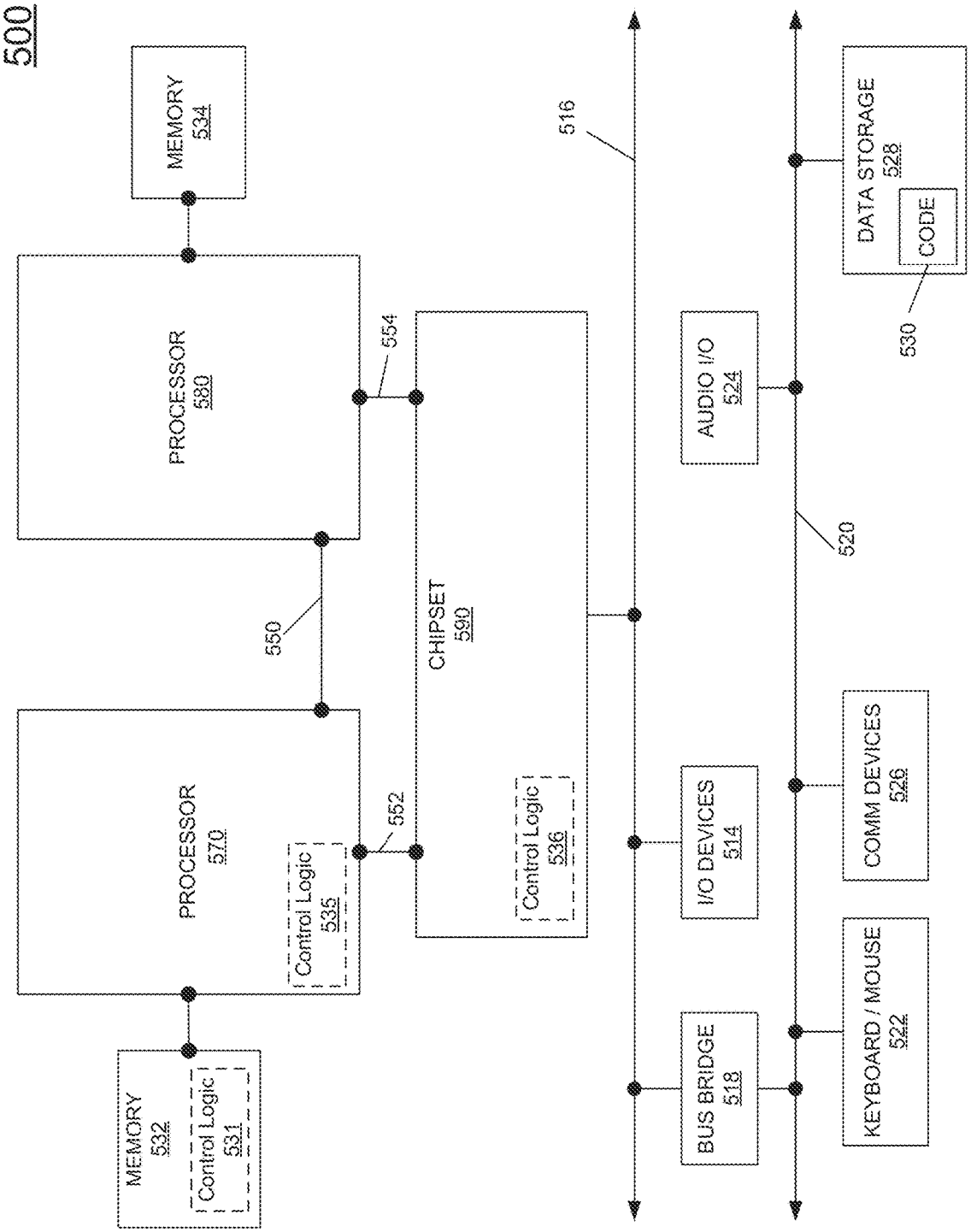
FIG. 5 includes a system for implementing an embodiment of the invention.

Embodiments may be implemented in many different system types. Referring now to FIG. 5, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Code may be included in one or more memories including memory 528, 532, 534, memory coupled to system 500 via a network, and the like. Further, an audio I/O 524 may be coupled to second bus 520.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (535). However, in another embodiment, logic also includes software or code (531). Such logic may be integrated with hardware, such as firmware or micro-code (536). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory machine-readable storage medium that includes instructions, that when executed by a secure data vault system processor at a first computing system of a secure data vault system, cause the secure data vault system processor to:

receive, at the first computing system from a customer computing device, a plurality of first security credentials of a payor customer, the plurality of first security credentials associated with respective accounts of the payor customer;

cause a storage of the plurality of first security credentials at the first computing system;

identify a first payee system from a list of payee systems, each payee system of the list of payee systems having an established relationship with the secure data vault system, the first payee system associated with a respective one of the plurality of first security credentials; and automatically retrieve, by the first computing system on a periodic basis and without involvement of the payor customer, a plurality of respective first account electronic documents associated with the payor customer from a second computing system associated with the first payee system, using the plurality of first security credentials associated with the payor customer and stored at the secure data vault system, wherein the periodic basis corresponds to a time for obtaining additional documents from a respective payee system, and wherein each of the periodic retrievals includes operations to:

provide, by the first computing system, the respective one of the plurality of first security credentials stored at the first computing system and associated with the payor customer to the second computing system;

receive, in response to a successful authentication of the respective one of the plurality of first security credentials associated with the payor customer by the second computing system, a respective one of the first account electronic documents, wherein the respective one of the first account electronic documents is signed using an encrypted hash coupled to the respective one of the first account electronic documents;

verify the respective one of the first account electronic documents, based on comparing a hash generated from the respective one of the first account electronic documents with a decrypted hash generated from the encrypted hash coupled to the respective one of the first account electronic documents; and store the respective one of the first account electronic documents retrieved from the first payee system at the first computing system, the respective one of the first account electronic documents being associated with the payor customer.

2. The non-transitory machine-readable storage medium of claim 1, wherein the instructions cause the secure data vault system processor to:

establish a cooperation between the secure data vault system and a second payee system, the cooperation to permit the secure data vault system to pull documents from the second payee system.

3. The non-transitory machine-readable storage medium of claim 2, wherein the instructions cause the secure data vault system processor to:

cause the secure data vault system to form the cooperation with the second payee system responsive to receipt of a request by the payor customer to establish the cooperation between the secure data vault system and the second payee system.

4. The non-transitory machine-readable storage medium of claim 1, wherein the instructions cause the secure data vault system processor to:

automatically organize the first account electronic documents from the first payee system.

5. The non-transitory machine-readable storage medium of claim 1, wherein the instructions that cause the secure data vault system processor to automatically retrieve the first account electronic documents associated with the payor customer from the first payee system at the second computing system, further cause the secure data vault system processor to:

automatically retrieve one or more billing statements associated with the payor customer from the first payee system.

6. The non-transitory machine-readable storage medium of claim 1, wherein the instructions cause the secure data vault system processor to:

receive, at the first computing system from a second customer computing device, a second plurality of security credentials of a second payor customer, the second plurality of security credentials associated with respective accounts of the second payor customer;

cause a storage of the second plurality of security credentials at the first computing system; and automatically retrieve, on a periodic basis, one or more second account documents associated with the second payor customer from the first payee system at the second computing system, without involvement of the second payor customer, and using the plurality of second security credentials associated with the second payor customer and stored at the secure data vault system, by:

providing, by the secure data vault system, a respective one of the plurality of second security credentials stored at the first computing system and associated with the second payor customer to the first payee system;

receiving indication of a successful validation of the respective one of the plurality of second security credentials associated with the second payor customer by the first payee system; and storing the one or more second account documents from the first payee system, the one or more second account documents being associated with the second payor customer.

7. A secure data vault system comprising:

at least one processor; and at least one non-transitory machine-readable storage medium that includes instructions that, when executed by the at least one processor, cause the processor to:

receive, at a first computing system from a customer computing device, a plurality of first security credentials of a payor customer, the plurality of first security credentials associated with respective accounts of the payor customer;

cause a storage of the plurality of first security credentials at the first computing system;

identify a first payee system from a list of payee systems, each payee system of the list of payee system having an established relationship with the secure data vault system, the first payee system associated with a respective one of the plurality of first security credentials; and automatically retrieve, on a periodic basis and without involvement of the payor customer, one or more first account electronic documents associated with the payor customer from a second computing system associated with the first payee system, using the plurality of first security credentials associated with the payor customer and stored at the secure data vault system, wherein the periodic basis corresponds to a time for obtaining additional documents from a respective payee system, and wherein each of the periodic retrievals includes operations to:

provide, by the first computing system the respective one of the plurality of first security credentials stored at the first computing system and associated with the payor customer to the second computing system;

receive, in response to a successful authentication of the respective one of the first security credentials associated with the payor customer by the second computing system, a respective one of the first account electronic documents, wherein the respective one of the first account electronic documents is signed using an encrypted hash coupled to the respective one of the first account electronic documents;

verify the respective one of the first account electronic documents, based on comparing a hash generated from the respective one of the first account electronic documents with a decrypted hash generated from the encrypted hash coupled to the respective one of the first account electronic documents; and store the respective one of the first account electronic documents retrieved from the first payee system, the respective one of the first account electronic documents being associated with the payor customer.

8. The secure data vault system of claim 7 wherein the instructions cause the at least one processor to:

establish a cooperation between the secure data vault system and a second payee system, the cooperation to permit the secure data vault system to pull documents from the second payee system.

9. The secure data vault system of claim 8 wherein the instructions cause the at least one processor to:
   cause the secure data vault system to form the cooperation with the second payee system responsive to receipt of a request by the payor customer to establish the cooperation between the secure data vault system and the second payee system.

10. The secure data vault system of claim 7 wherein the instructions cause the at least one processor to:
    automatically organize the first account electronic documents from the first payee system.

11. The secure data vault system of claim 7 wherein the instructions that cause the at least one processor to automatically retrieve the one or more first account electronic documents associated with the payor customer from the first payee system at the second computing system, further cause the at least one processor to:
    automatically retrieve one or more billing statements associated with the payor customer from the first payee system.

12. The secure data vault system of claim 7, wherein the instructions cause the at least one processor to:
    receive, at the first computing system from a second customer computing device, a second plurality of security credentials of a second payor customer, the second plurality of security credentials associated with respective accounts of the second payor customer;
    cause a storage of the second plurality of security credentials at the first computing system; and
    automatically retrieve, on a periodic basis, one or more second account documents associated with the second payor customer from the first payee system at the second computing system, without involvement of the second payor customer, and using the plurality of second security credentials associated with the second payor customer and stored at the secure data vault system, by:
        providing, by the secure data vault system, a respective one of the plurality of second security credentials stored at the first computing system and associated with the second payor customer to the first payee system;
        receiving indication of a successful validation of the respective one of the plurality of second security credentials associated with the second payor customer by the first payee system; and
        storing, at the first computing system, the one or more second account documents from the first payee system, the one or more second account documents being associated with the second payor customer.

13. A method performed by a secure data vault system, comprising:
    receiving, at a first computing system from a customer computing device, a plurality of first security credentials of a payor customer, the plurality of first security credentials associated with respective accounts of the payor customer;
    storing the plurality of first security credentials at a first computing system;
    identifying a first payee system from a list of payee systems, each payee system of the list of payee systems having an established relationship with the secure data vault system, the first payee system associated with a respective one of the plurality of first security credentials; and
    automatically retrieving, by the first computing system on a periodic basis and without involvement of the payor customer, a plurality of respective first account electronic documents associated with the payor customer from a second computing system associated with the first payee system, using the plurality of first security credentials associated with the payor customer and stored at the secure data vault system, wherein the periodic basis corresponds to a time for obtaining additional documents from a respective payee system, and wherein each of the periodic retrievals includes:
        providing, by the first computing system, at least one of the plurality of first security credentials stored at the first computing system and associated with the payor customer to the second computing system;
        receiving, in response to a successful authentication of at least one of the plurality of first security credentials associated with the payor customer by the second computing system, a respective one of the first account electronic documents, wherein the respective one of the first account electronic documents is signed using an encrypted hash coupled to the respective one of the first account electronic documents;
        verify the respective one of the first account electronic documents, based on comparing a hash generated from the respective one of the first account electronic documents with a decrypted hash generated from the encrypted hash coupled to the respective one of the first account electronic documents; and
        store the respective one of the first account electronic documents received from the first payee system, the respective one of the first account electronic documents being associated with the payor customer.

14. The method of claim 13, further comprising:
    establishing, by the secure data vault system, a cooperation between the secure data vault system and a second payee system, the cooperation to permit the secure data vault system to pull documents from the second payee system.

15. The method of claim 14, further comprising:
    causing, by the secure data vault system, the secure data vault system to form the cooperation with the second payee system responsive to receipt of a request by the payor customer to establish the cooperation between the secure data vault system and the second payee system.

16. The method of claim 13, further comprising:
    automatically organizing, by the secure data vault system, the first account electronic documents from the first payee system.

17. The method of claim 13, wherein automatically retrieving the first account electronic documents associated with the payor customer from the first payee system at the second computing system, the automatic retrieval responsive to a successful validation of the first security credential associated with the payor customer by the first payee system, comprises:
    automatically retrieving, by the secure data vault system, one or more billing statements associated with the payor customer from the first payee system.

18. The method of claim 13, further comprising:
    causing, by the secure data vault system, a storage of a second plurality of security credentials at the first computing system, each of the second plurality of security credentials associated with a second payor customer; and
    automatically retrieving, on a periodic basis, by the secure data vault system, one or more second account documents associated with the second payor customer from the first payee system at the second computing system by:
provlding, by the secure data vault system, a respective one of the plurality of second security credentials stored at the first computing system and associated with the second payor customer to the first payee system;
receiving indication of a successful validation of the respective one of the plurality of second security credentials associated with the second payor customer by the first payee system; and
storing the one or more second account documents received from the first payee system, the one or more second account documents being associated with the second payor customer.

19. A secure data vault system, comprising:
means for receiving, at a first computing system from a customer computing device, a plurality of first security credentials of a payor customer, the plurality of first security credentials associated with respective accounts of the payor customer;
means for storing a plurality of first security credentials at the first computing system;
means for identifying a first payee system from a list of payee systems, each of the payee systems of the list of payee systems having an established relationship with the secure data vault system, the first payee system associated with a respective one of the plurality of first security credentials; and
means for automatically retrieving, on a periodic basis and without involvement of the payor customer, a plurality of respective first account electronic documents associated with the payor customer from a second computing system associated with the first payee system, using the plurality of first security credentials associated with the payor customer and stored at the secure data vault system, wherein the periodic basis corresponds to a time for obtaining additional documents from a respective payee system, and wherein each of the periodic retrievals includes:
providing, by the first computing system the respective one of the plurality of first security credentials stored at the first computing system and associated with the payor customer to the second computing system;
receiving, in response to a successful authentication of the respective one of the plurality of first security credentials associated with the payor customer by the second computing system, a respective one of the first account electronic documents, wherein the respective one of the first account electronic documents is signed using an encrypted hash coupled to the respective one of the first account electronic documents;
verify the respective one of the first account electronic documents, based on comparing a hash generated from the respective one of the first account electronic documents with a decrypted hash generated from the encrypted hash coupled to the respective one of the first account electronic documents; and
storing the respective one of the first account electronic documents received from the first payee system, the respective one of the first account electronic documents being associated with the payor customer.

20. The system of claim 19, further comprising:
means for establishing a cooperation between the secure data vault system and a second payee system, the cooperation to permit the secure data vault system to pull documents from the second payee system.

21. The system of claim 20, further comprising:
means for forming the cooperation with the second payee system responsive to receipt of a request by the payor customer to establish the cooperation between the secure data vault system and the second payee system.

22. The system of claim 19, further comprising:
means for automatically organizing the first account electronic documents from the first payee system.

23. The system of claim 19, wherein the means for automatically retrieving the respective first account electronic documents associated with the payor customer from the first payee system at the second computing system, the automatic retrieval responsive to a successful validation of a first security credential associated with the payor customer by the first payee system comprises:
means for automatically retrieving one or more billing statements associated with the payor customer from the first payee system.

24. The system of claim 19, further comprising:
means for receiving, at the first computing system from a second customer computing device, a second plurality of security credentials of a second payor customer, the second plurality of security credentials associated with respective accounts of the second payor customer;
means for storing the second plurality of security credentials at the first computing system; and
means for automatically retrieving, on a periodic basis, one or more second account documents associated with the second payor customer from the first payee system at the second computing system, without involvement of the second payor customer, and using the plurality of second security credentials associated with the second payor customer and stored at the secure data vault system, by:
providing, by the secure data vault system, a respective one of the plurality of second security credentials stored at the first computing system and associated with the second payor customer to the first payee system;
receiving indication of a successful validation of the respective one of the plurality of second security credentials associated with the second payor customer by the first payee system; and
storing the one or more second account documents from the first payee system, the one or more second account documents being associated with the second payor customer.

\* \* \* \* \*